United States Patent
Mealey et al.

[11] Patent Number: 5,826,090
[45] Date of Patent: Oct. 20, 1998

[54] LOADABLE HARDWARE SUPPORT

[75] Inventors: Bruce Gerard Mealey, Austin; Randal Craig Swanberg, Round Rock; Michael Stephen Williams, Austin, all of Tex.

[73] Assignee: International Business Machines Corporation, Armonk, N.Y.

[21] Appl. No.: 820,471

[22] Filed: Mar. 17, 1997

[51] Int. Cl.[6] .................................................. G06F 9/06
[52] U.S. Cl. .......................................... 395/712; 395/652
[58] Field of Search ...................................... 395/651, 652, 395/653, 712, 200.5, 200.51, 200.52

[56] References Cited

U.S. PATENT DOCUMENTS

| | | | |
|---|---|---|---|
| 5,355,489 | 10/1994 | Bealkowski et al. | 395/652 |
| 5,386,561 | 1/1995 | Huynh et al. | |
| 5,394,547 | 2/1995 | Correnti et al. | |
| 5,586,324 | 12/1996 | Sato et al. | 395/652 |
| 5,586,327 | 12/1996 | Bealkowski et al. | 395/652 |

*Primary Examiner*—Kevin A. Kriess
*Attorney, Agent, or Firm*—Richard A. Henkler; Jack V. Musgrove; Andrew J. Dillon

[57] ABSTRACT

An improved operating system for a computer provides support for specific hardware components. The operating system is loaded by first loading a base portion which initializes the operating system and determines the particular type of hardware components present. Then, appropriate software components are loaded that are specifically associated with the hardware components. The hardware components can be detected by leaving a trace in the memory device that is associated with the software component and later retrieving the trace, or by testing the computer for the hardware component. The hardware component may be a bus architecture selected from a group of bus architectures, and bus-independent interfaces are defined which are mapped to addresses in the kernel. Alternatively, the software component can include a PAL which contains specific instructions for communicating with the hardware component. The PAL is constructed from a plurality of files each associated with the hardware component.

16 Claims, 1 Drawing Sheet

LOADABLE HARDWARE SUPPORT

BACKGROUND OF THE INVENTION

1. Field of the Invention

The present invention generally relates to computer systems, and more particularly to a method of providing software support for different hardware platforms, including different bus configurations.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 also includes firmware 24 whose primary purpose is to seek out and load an operating system from one of the peripherals (usually permanent memory device 16) whenever the computer is first turned on. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor.

In today's computer architectures, great flexibility is available to hardware designers, allowing differentiation between computer platforms among various vendors that still meet an industry-defined architecture (standard). These differences in the computer platforms must be accommodated by operating systems that run on them. In a software OEM (original equipment manufacturer) environment, this means that a hardware vendor must have access to all the source code for each operating system that is going to run on the system. These hardware vendors then modify the operating system source code to run in their computer platform. This approach has several problems. First of all, an operating system source code license is needed and is very expensive. Second, much of the operating system has no dependency on the hardware that is different. Third, the vendor must dedicate assets to building the operating system and repackaging it for the target platforms. Finally, as each new version of the operating system is released by the OEM, the vendor must repeat any modifications done to the prior version on the new one in order to allow it to function on the target platforms.

One approach to this problem is to include support for a large number of hardware platforms in a single version of the operating system, such as is provided by the hardware abstraction layer ("HAL") of Microsoft Corp. With HAL, code is written to the abstracted interfaces, then bound into the primary memory (kernel) to produce a single loadable image. This image is targeted for a single platform or group of platforms where minute differences in hardware can be handled with runtime checks. Significant changes in the hardware platform, however, require an entirely new image which will not run on the old platforms. This approach also increases implementation time, complicates media creation by adding to the number of different install medias, and also increases test time.

One manner in which hardware platforms can differ relates to the many different types of input/output (I/O) bus lines which can be used for bus 20. Conventional bus designs include, for example, PCI (Peripheral Component Interface) and ISA (Industry Standard Architecture) created by IBM. A single machine can use more than one bus architecture, e.g., have a system bus from the processor that connects to other I/O busses via bridges. As new computer systems are developed with different I/O busses, the operating system must be changed and re-released to support each new bus or each new combination. This requirement becomes expensive due to packaging and testing of each system. Also, since the code to support a bus is an integral part of the operating system, it takes up valuable memory resources even though the bus may not be present on the system. In other words, the operating system, when running, may include software components for supporting many different bus designs even though it needs only one to run on any particular machine.

The foregoing generally applies to any type of operating system, but the present invention has particular application to UNIX (UNIX is a trademark of UNIX System Laboratories). UNIX is a multi-user, multi-tasking operating system which is available from a variety of sources with different versions. These include, among others, System V (American Telephone & Telegraph), AIX (International Business Machines) and Mach (NeXT Computers). It is a problem for manufacturers of UNIX-type workstations (and their vendors) to add bus support for busses not supported by that manufacturer. For example, Motorola manufactures computers with its VME bus, and so must add support for the VME bus to AIX (licensed by IBM) so that they can use AIX on their platforms. This procedure becomes very expensive for every manufacturer as it must be done for each release of the particular operating system. It would, therefore, be desirable to provide an operating system that allows for hardware-specific support without requiring the operating system to include support for multiple hardware platforms. It would be further advantageous if the operating system were designed for one release media that would work across all platforms, and still be easily adapted for new hardware platforms.

SUMMARY OF THE INVENTION

It is therefore one object of the present invention to provide an improved computer operating system having hardware-specific support.

It is another object of the present invention to provide such an operating system that does not unnecessarily use resources by including support for hardware platforms that are not present in the particular machine that is running the operating system.

It is yet another object of the present invention to provide a method of loading such an operating system that simplifies repackaging of the media for new hardware platforms.

The foregoing objects are achieved in a method of providing an operating system for a computer, generally comprising the steps of loading a base portion of an operating system into the memory of the computer, the base portion having instructions for detecting the hardware component, detecting the hardware component using those instructions, and then loading a software component that is specifically associated with the hardware component once the hardware component has been detected. The hardware component can be detected by leaving a trace in the memory device that is associated with the software component and later retrieving the trace, or by testing the computer for the hardware component. The hardware component may be a bus architecture selected from a group of bus architectures, and the detecting step defines a set of bus-independent interfaces mapped to addresses in the kernel. Alternatively, the software component can include a program abstraction layer (PAL) which contains specific instructions for communicating with the hardware component. The PAL is constructed from a plurality of files each associated with the hardware component.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
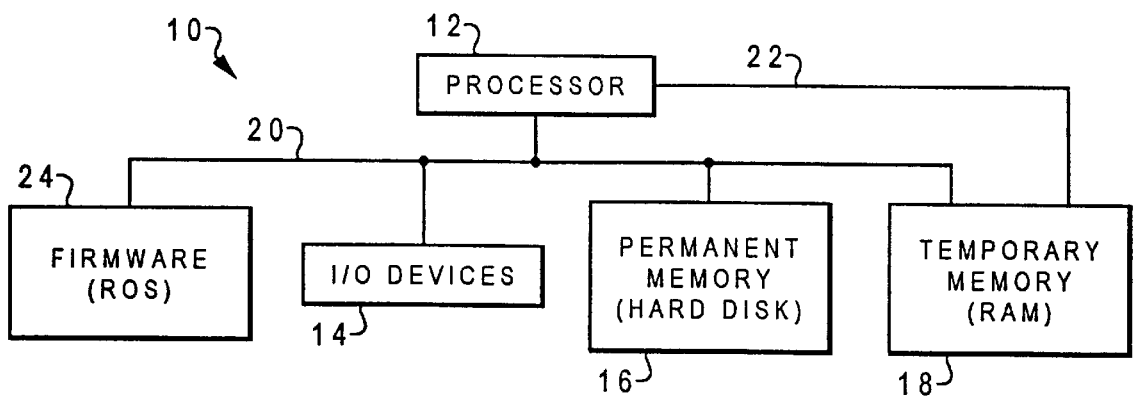
FIG. 1 is a block diagram depicting typical hardware for a conventional computer system.

The present invention is directed to a method of loading an operating system on a computer which has a particular hardware platform that requires specific software support to be provided by the operating system. The computer hardware may include the various components shown in FIG. 1, but the computer system is not necessarily conventional, i.e., it could include new hardware components as well, or have a novel interconnection architecture for existing components.

Figure 2:
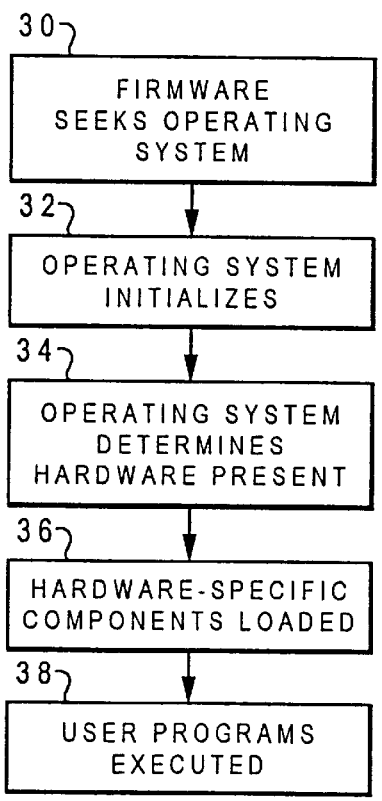
FIG. 2 is a flow chart depicting how, according to the present invention, hardware-specific components are loaded in the operating system during the boot sequence.

With reference to FIG. 2, as with prior-art operating systems, the operating system of the present invention is loaded as part of a "boot" sequence that begins (when the computer is first turned on or in response to a "soft" boot command) with the firmware seeking an operating system on one of the storage devices, e.g., a floppy diskette, magnetic hard drive, or CD-ROM disk (30). In the present invention, however, the operating system does not load in an uninterrupted manner. Rather, the operating system is first initialized by loading only a base portion of the software components (32). These base components provide functionality which allow the operating system to determine the particular hardware platform that is present (34) and to load appropriate, hardware-specific components (36) to complete the boot sequence. The base functionality may, for instance, construct linked lists of free buffers and inodes, hash queues, region structures, etc. After the operating system is fully loaded with the hardware-specific components, user applications may be executed (38), or other software components may be loaded, such as dynamic device drivers.

The foregoing method may be implemented in various ways, two of which are described below. In a first implementation, each computer platform vendor provides a special firmware or ROS code that initially runs on the computer. This code not only initializes the hardware and loads the operating system, but also leaves various information (e.g., in the computer's RAM) about the hardware configuration for the operating system to later retrieve. Some of this information is unique to the hardware vendor or computer platform. Using this information, unique names can be created for each computer system. These names can then be used as filenames, and the filenames are associated with different modules that can be loaded to provide the support for the differentiating hardware. Although the names can be pre-assigned based on a table, it is preferable to dynamically generate the name, according to a known formula, based on the firmware trace; this approach allows the operating system to more easily adapt to completely new hardware platforms, in addition to supporting those platforms existing at the time of the original release of the operating system, by simply generating the filename of a new file that is added to the release media.

For example, an operating system for a UNIX-type workstation includes a PAL (Portability Assist Layer, or Platform Abstraction Layer), which contains the specific instructions for communicating with the particular hardware devices of a given manufacturer. The PAL, which is loaded into the kernel of the workstation, is selected from among a variety of available PALs on the installation media, based on the firmware trace. If the particular machine on which the operating system is being loaded is a RISC System Personal Computer, the manufacturer may have encoded information in the firmware trace which is equivalent to the letters "rspc." The operating system detects this, and then looks for a PAL which includes the files "planar$_{13}$pal$_{13}$rspc," "librarycfg$_{13}$rspc," "mkboot$_{13}$rspc," "bootinfo$_{13}$rspc," etc. These files together constitute one of many sets of PAL files provided for the different hardware platforms. The hardware-specific components are not just kernel extensions but, e.g., can further provide machine specific commands.

In this manner, a vendor does not need to load a customized operating system, and so no operating system source license is needed. This approach also makes it easy for the vendor to build one media for all computer platforms that conform to a given architecture, and a much smaller set of assets must be maintained to build release media. As new versions of the operating system are released, no new modifications are required, since the release media can be rebuilt with the new system and the PAL modules. This approach also saves RAM space since unneeded code is not loaded. The invention differs greatly from the prior-art HAL in that the present invention provides the ability to dynamically load a set of interfaces at boot time. With the present invention, a new kernel is not required on each release media, just an addition-loadable image to support the new platform. Once the new image is added to the media, the configuration code will load the correct PAL module for the platform being configured, saving in installation time, media creation, number of different install medias, and test time.

In a second implementation, a UNIX-type workstation is provided with loadable bus support. The code needed to support a particular input/output (I/O) bus is created as a loadable extension. The code module can be packaged into the boot RAM filesystem on the installation media. Early in the configuration of the system, each I/O bus present on the machine is detected and, for each bus that is identified, its bus support code is loaded and set up. This approach again allows vendors to add their bus support code to the media which then is loaded by the operating system, and so does not require any source license. Code for busses that do not exist on the computer system are not loaded, thereby saving memory resources.

Detection of the type of busses present can be accomplished by defining a set of common (and bus-independent) interfaces. For each bus found in the system, software is loaded that supports these interfaces with address mappings to the kernel, for example, via a new "$bus_{13}register/unregister$" interface. Direct memory access (DMA) services can be added through a well-defined interface such as the "$d_{13}map_{13}init(\ )$" interface. These services are added by the newly loaded bus extension(s) at configuration time. In addition, each different bus type is assigned a unique identifier and, as each bus is detected during the configuration of the system, it is assigned a unique number within the type. These assignments allow for dynamic creation of a unique bus identifier (BID) for each bus in the system. The BID allows the bus to be abstracted from device drivers (it is part of the configuration information given to the device driver during its configuration). This BID can then be passed to kernel services used by device drivers, like "$iomem_{13}att(\ )$" or "$iomem_{13}det(\ )$," and the DMA support functions. The BID indicates the bus number, type, and region, I/O space, or MEM space; this information can be used to look up address information for the bus that was provided when the bus was registered via bus_register( ). Mappings to various bus hardware can now be set up for the device driver without the device driver knowing how the system address map is partitioned for I/O bus access.

Both of the foregoing implementations differ from conventional device drivers since the present invention provides the ability to abstract and load in system-level support code which cannot be done with prior-art methods.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of providing an operating system for a computer having a processor for carrying out program instructions, a memory device connected to the processor, and a hardware component connected to the processor, the method comprising the steps of:

loading into the memory device a base portion of an operating system, the base portion having instructions for dynamically detecting the hardware component;

dynamically detecting the hardware component using the instructions; and loading a software component into the operating system that is specifically associated with the hardware component.

2. The method of claim 1 wherein said detecting step includes the steps of:

leaving a trace in the memory device, the trace being associated with the software component; and the base portion retrieving the trace.

3. The method of claim 1 wherein said detecting step includes the step of the base portion testing the computer for the hardware component.

4. The method of claim 1 wherein:

the hardware component is a bus architecture selected from a group of bus architectures; and said detecting step includes the step of defining a set of bus-independent interfaces.

5. The method of claim 1 wherein:

the computer is a UNIX-type workstation; and the software component includes a PAL which contains specific instructions for communicating with the hardware component.

6. The method of claim 2 wherein:

the computer has firmware for seeking and loading an operating system; and the trace is left by the firmware.

7. The method of claim 2 wherein:

the computer is a UNIX-type workstation; and the software component includes a PAL which contains specific instructions for communicating with the hardware component.

8. The method of claim 3 wherein:

the hardware component is a bus architecture selected from a group of bus architectures; and said detecting step includes the step of defining a set of bus-independent interfaces.

9. The method of claim 7 wherein the PAL is constructed from a plurality of files each associated with the hardware component.

10. The method of claim 8 wherein:

the computer is a UNIX-type workstation having a kernel; and the interfaces are mapped to addresses in the kernel.

11. A method of providing support for a hardware component connected to a computer system, the computer system having a memory device and firmware for seeking and loading an operating system, the method comprising the steps of:

leaving a trace in the memory device by the firmware, the trace being associated with the hardware component;

loading into the memory device of the computer system a base portion of an operating system, the base portion having instructions for retrieving the trace;

retrieving the trace; and loading a software component into the operating system that is specifically associated with the trace.

12. The method of claim 11 wherein:

the computer system is a UNIX-type workstation; and the software component includes a PAL which contains specific instructions for communicating with the hardware component.

13. The method of claim 12 wherein the PAL is constructed from a plurality of files each associated with the hardware component.

14. A method of providing support for a computer system having one or more bus architectures, the computer system having a memory device and firmware for seeking and loading an operating system, the method comprising the steps of:

loading into the memory device a base portion of an operating system, the base portion having instructions for testing for the presence of the hardware component;

testing for the hardware component using a set of bus-independent interfaces; and loading a software component into the operating system that is specifically associated with the hardware component.

15. The method of claim 14 wherein:

the computer is a UNIX-type workstation; and the software component includes a PAL which contains specific instructions for communicating with the hardware component.

16. The method of claim 14 wherein:
the computer is a UNIX-type workstation having a kernel; and
the interfaces are mapped to addresses in the kernel.

* * * * *